US007213698B2

(12) United States Patent
Stone

(10) Patent No.: US 7,213,698 B2
(45) Date of Patent: May 8, 2007

(54) SENSORS FOR ARTICLE SORTER

(75) Inventor: Robert L Stone, Rockford, MI (US)

(73) Assignee: Siemens Energy & Automation, Alpharetta, GA (US)

( * ) Notice: Subject to any disclaimer, the term of this patent is extended or adjusted under 35 U.S.C. 154(b) by 591 days.

(21) Appl. No.: 10/720,581

(22) Filed: Nov. 24, 2003

(65) Prior Publication Data

US 2004/0245157 A1 Dec. 9, 2004

Related U.S. Application Data

(60) Provisional application No. 60/469,478, filed on May 9, 2003.

(51) Int. Cl.
*B65G 47/10* (2006.01)

(52) U.S. Cl. ................. 198/358; 198/359; 198/370.03; 209/603

(58) Field of Classification Search ................ 198/358, 198/359, 370.01, 370.03, 371.2; 209/603, 209/604, 900, 922, 927
See application file for complete search history.

(56) References Cited

U.S. PATENT DOCUMENTS

| | | | | |
|---|---|---|---|---|
| 3,782,541 | A | 1/1974 | Wood | 209/74 |
| 3,838,411 | A * | 9/1974 | Vander meer | 340/538 |
| 4,688,678 | A | 8/1987 | Zue et al. | 209/552 |
| 5,263,300 | A | 11/1993 | Plent et al. | 53/244 |
| 5,293,983 | A | 3/1994 | Grapes et al. | 198/358 |
| 5,346,351 | A | 9/1994 | Priolo et al. | 414/277 |
| 5,363,967 | A | 11/1994 | Tilles et al. | 209/539 |
| 5,392,894 | A | 2/1995 | Grapes et al. | 198/367 |
| 5,419,440 | A | 5/1995 | Picoult | 209/583 |
| 5,419,457 | A | 5/1995 | Ross et al. | 209/616 |
| 5,535,874 | A | 7/1996 | Ross et al. | 198/477.1 |
| 5,538,140 | A | 7/1996 | Guenther et al. | 209/552 |
| 5,695,071 | A | 12/1997 | Ross et al. | 209/616 |
| 5,794,789 | A | 8/1998 | Payson et al. | 209/549 |
| 5,887,698 | A * | 3/1999 | Soldavini | 198/360 |
| 6,283,304 | B1 * | 9/2001 | Gottlieb et al. | 209/603 |
| 6,435,353 | B2 | 8/2002 | Ryan, Jr. et al. | 209/706 |
| 6,478,144 | B1 | 11/2002 | Sweazy | 198/890 |
| 6,494,324 | B2 * | 12/2002 | Ours et al. | 206/527 |
| 6,561,339 | B1 | 5/2003 | Olson et al. | 198/349 |
| 2001/0047922 | A1 * | 12/2001 | Meyer | 198/358 |
| 2002/0070149 | A1 | 6/2002 | Schererz et al. | 209/540 |
| 2002/0125177 | A1 | 9/2002 | Burns et al. | 209/630 |
| 2003/0006174 | A1 | 1/2003 | Harres et al. | 209/584 |
| 2003/0141226 | A1 | 7/2003 | Morikawa | 209/584 |

* cited by examiner

*Primary Examiner*—James R. Bidwell
(74) *Attorney, Agent, or Firm*—Van Dyke, Gardner, Linn & Burkhart, LLP

(57) ABSTRACT

A sortation assembly includes a plurality of chutes which are movable along a continuous loop and along and over a plurality of sort stations. The chutes are operable to deposit articles, such as mail or flats mail or the like, to appropriate bins or trays positioned at the sort stations. The sort stations are configured to support a tray thereon for filling of the tray by the chutes. At least some of the chutes include an electronic tray fill level sensor, which is operable to detect the level of articles deposited within the tray at which the chute is positioned, while being spaced from the tray and the articles. Also, at least some of the sort stations may include an electronic tray present sensor, which is operable to detect the presence of a tray at the respective sort station while being spaced from the tray at the sort station.

14 Claims, 2 Drawing Sheets

FIG. 5
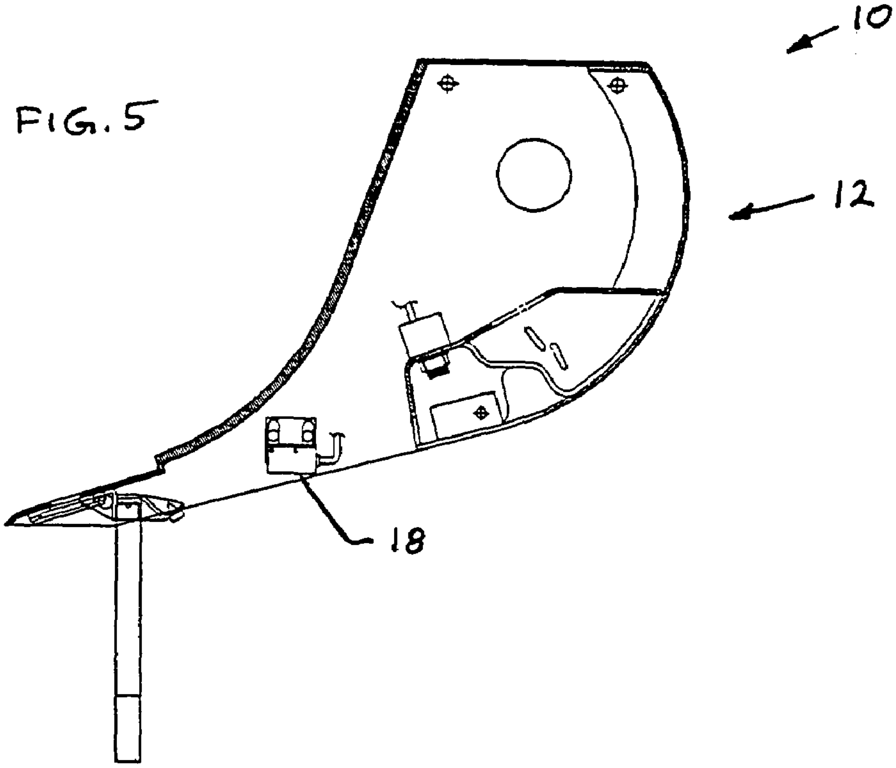
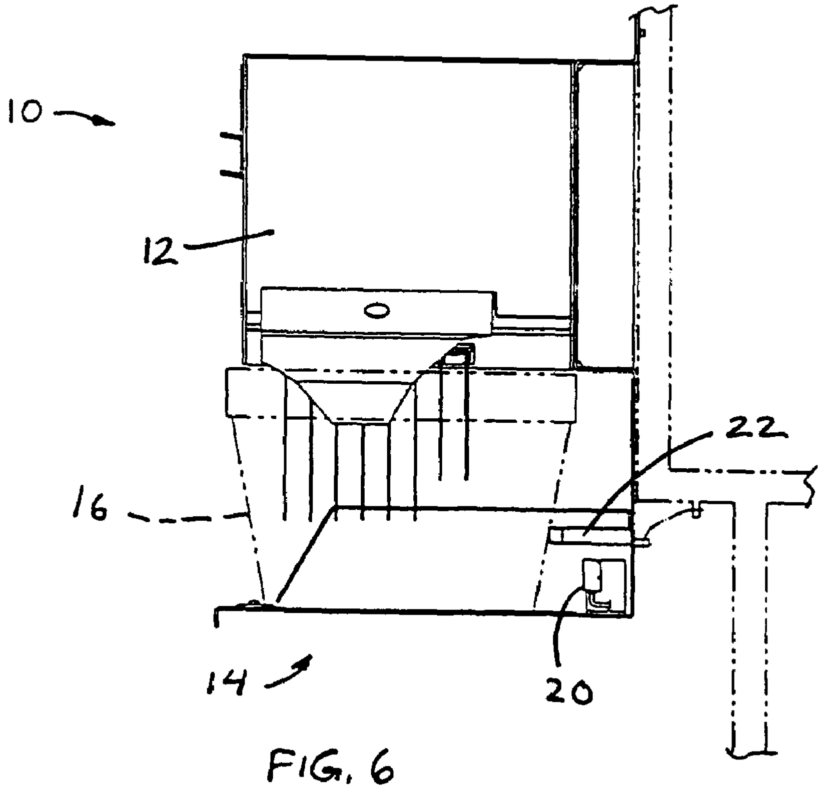
FIG. 6

SENSORS FOR ARTICLE SORTER

CROSS REFERENCE TO RELATED APPLICATION

The present application claims priority of U.S. provisional application Ser. No. 60/469,478, filed May 9, 2003, which is hereby incorporated herein by reference in its entirety.

FIELD OF THE INVENTION

The present invention relates generally to sortation systems for sorting articles into trays or bins and, more particularly, to sortation systems for sorting flats mail articles to mail trays.

BACKGROUND OF THE INVENTION

It is known to provide a sortation system which includes a plurality of chutes which are movable along a generally continuous loop to deposit articles, such as mail articles or the like, into appropriate bins or trays positioned at a plurality of sort stations of the sortation system. As shown in FIGS. 1 and 2, each chute 2 of a sortation system typically includes a tray full detecting arm 3, which is pivotally mounted to the chutes 2 and which is pivotable about a pivot axis 3*a* in response to the end of the sensor arm contacting the articles or mail deposited in the tray or bin 4 (such as a flats mail tray or the like) by the chute. As the level of articles in the tray increases, the articles push the end of the sensor arm upward. As can be seen in FIG. 2, as sensor arm 3 is pushed upward, the arm may pivot and may trigger a switch when the arm has pivoted a threshold amount. The sortation system and/or chutes may be controlled to stop depositing more articles into that bin in response to the arm triggering the switch.

Also, and as shown in FIGS. 3 and 4, each sort station may include a tray detecting mechanism 5, which is operable to indicate the presence of a tray or bin 4 at the sort station via pivotable movement of a pivot arm 6, which contacts the tray and pivots as the tray is pushed into the sort station. As can be seen in FIGS. 3 and 4, the pivot arm 6 may pivot about a pivot axis 6*a* in response to the tray being pushed fully into the sort station, whereby a cammed surface 6*b* of the pivot arm may actuate a switch to indicate that the tray is present at the respective sort station.

Because the conventional tray full detecting arm and tray detecting mechanism are mechanical assemblies, they may require movable contact with the mail articles and/or trays. The tray full detecting arm may thus interfere with the mail or articles as the articles slide down the chute and into the tray, and thus may create chute jams that require operator assistance to clear so that sorting can continue. Also, the tray full detecting arm may allow the mail or articles to fill past the handle of the tray, which may present problems to an operator who has to pull and carry the trays after they have been filled. Although the tray full detecting arm typically can be adjusted, it typically cannot be lowered enough to avoid such filling conditions or concerns. Also, the conventional mechanical detecting or triggering assemblies typically utilize a limit switch that may be unreliable and may become filled or blocked with dust or the like, which may interfere with the contacts and may disable the assembly or mechanism until the limit switch is cleaned or replaced.

Therefore, there is a need in the art for a tray full sensing device and tray present sensing device which overcomes the shortcomings of the prior art.

SUMMARY OF THE INVENTION

The present invention provides an electronic tray fill level sensor for detecting the level of articles deposited into a tray or bin at a sort station of a sortation assembly and an electronic tray present sensor for detecting the presence of a tray at each sort station. The electronic sensors are spaced from the articles deposited by the chute and from the tray, and thus do not interfere with operation of the sortation system.

According to an aspect of the present invention, a sortation assembly for sorting articles and depositing articles into trays includes a plurality of chutes movable along a continuous loop. The chutes are movable along and over a plurality of sort stations and are operable to deposit articles to trays positioned at the sort stations, which are configured to support a tray thereon for filling of the tray by the chutes. At least one sensor is positioned at each chute and is operable to detect a fill level in a tray at a respective one of the sort stations at which the chute is positioned. The sensor is spaced from the tray positioned at the respective one of the sort stations and spaced from the articles deposited in the tray. The sensor is operable to generate an output signal indicative of the fill level within the tray. The chutes are operable at least partially in response to the output signal of the sensors.

The sensor may be operable to detect a distance between the sensor and the tray or articles in the tray and may be operable to generate an output signal indicative of the distance. In one form, the sensor comprises a diffuse electronic sensor. Optionally, the sensor may comprise multiple diffuse electronic sensors which are each operable to generate an output at a different trigger point or fill level to cooperatively indicate different fill levels of the trays. In another form, the sensor may comprise a laser sensor operable to generate the output signal in response to detections of multiple distances between the sensor and the articles within the tray.

The sortation assembly may include a tray present sensor positioned at each of the sort stations. The tray present sensor may be operable to detect the presence of a tray at the sort station and may be operable to generate an output signal indicative of the presence of a tray at the sort station. The chutes may be operable at least partially in response to the output signal of the tray present sensors. Optionally, the tray present sensor may be spaced from the tray positioned at the sort station and may be operable to detect a distance between the tray present sensor and the tray positioned at the respective sort station. The tray present sensor may comprise a diffuse electronic sensor.

According to another aspect of the present invention, a sortation assembly for sorting articles and depositing articles into trays includes a plurality of chutes movable along a continuous loop and movable along and over a plurality of sort stations and operable to deposit articles to trays positioned at the sort stations, which are configured to support a tray thereon for filling of the tray by the chutes. The sortation assembly includes a tray present sensor positioned at a respective one of the sort stations. The tray present sensor is operable to detect a presence of a tray at the respective sort station and is operable to generate an output signal indicative of whether or not a tray is present at the respective sort station. The tray present sensor is spaced from the tray positioned at the respective sort station. The chutes are operable at least partially in response to the tray present sensors.

The tray present sensors may be operable to detect distances between the sensors and the trays positioned at the respective tray stations. Each of the chutes may also include at least one tray fill level sensor operable to detect a fill level or level of articles in a tray at a respective one of the sort stations. The tray fill level sensor may be operable to generate an output signal indicative of the fill level within the tray, and the chutes may be operable at least partially in response to a respective one of the fill level sensors. The fill level sensor may be generally fixedly mounted to chute and/or spaced from the tray and from the articles deposited in the tray.

Therefore, the present invention provides for a sortation assembly having a tray fill level sensor spaced from and not contacting the articles deposited into a tray by the chutes. The present invention also provides a tray present sensor which is positioned at each sort station and is spaced from and not contacting the trays that are positioned at the sort stations. Therefore, the present invention provides non-mechanical and non-contacting electronic sensors which are operable to detect the presence of a tray and the fill level of articles within the tray. The non-mechanical and non-contacting sensors thus minimize interference with articles or trays during operation of the sortation assembly. Also, the electronic sensors do not include limit switches or the like that may become filled or blocked with dust, and thus provide enhanced reliability. If dust or dirt accumulates on the electronic sensors of the present invention, the dust may be removed or the sensors may be cleaned by wiping the sensors with a cloth or the like.

These and other objects, purposes, features and advantages of the present invention will become apparent upon review of the following specification in conjunction with the drawings.

BRIEF DESCRIPTION OF THE DRAWINGS

FIG. 5 is a side elevation and partial sectional view of a chute of a sortation assembly, with the chute including an electronic fill level sensor in accordance with the present invention; and FIG. 6 is an end elevation of the sortation assembly of FIG. 5, showing an electronic tray present sensor in accordance with the present invention.

DESCRIPTION OF THE PREFERRED EMBODIMENTS

Figure 1:
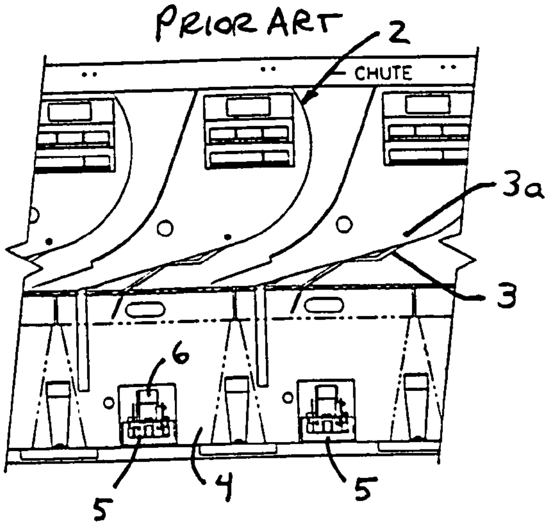
FIG. 1 is a side elevation of a sortation assembly having conventional tray full sensor assemblies and conventional tray present sensor assemblies.
Figure 3:
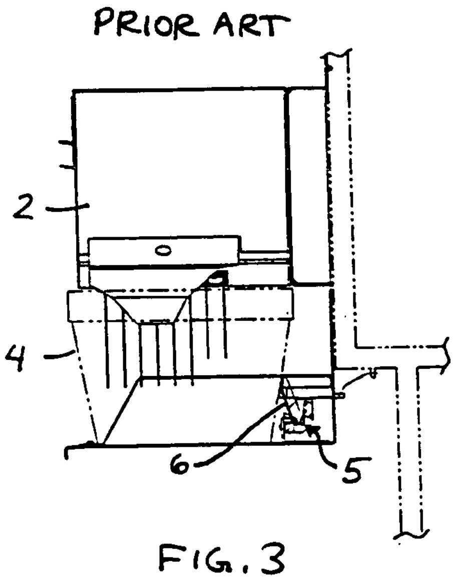
FIG. 3 is an end elevation and partial sectional view of the sortation assembly of FIG. 1.
Figure 2:
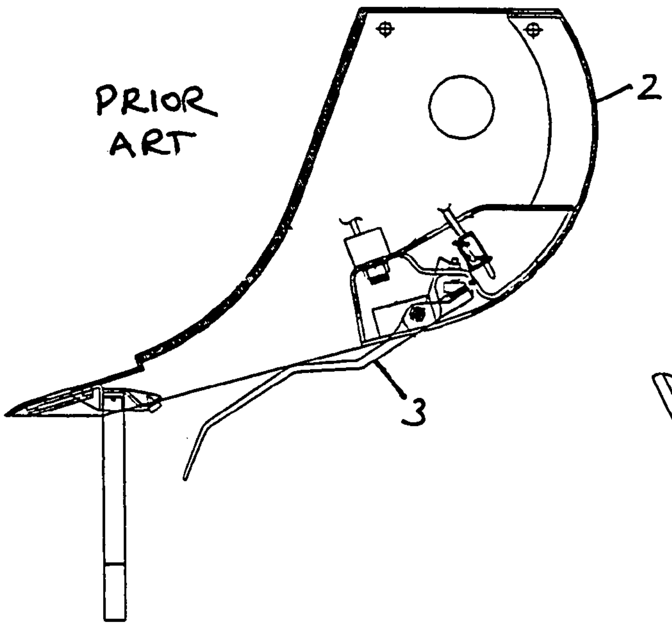
FIG. 2 is a side elevation and partial sectional view of one of the chutes of FIG. 1.
Figure 4:
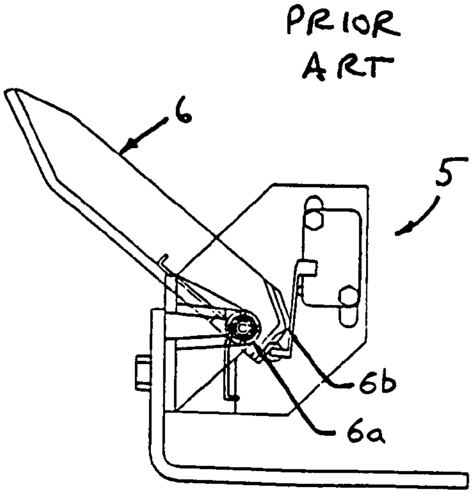
FIG. 4 is an enlarged end elevation of a tray present sensor assembly of FIGS. 1 and 3.

Referring now to the drawings and the illustrative embodiments depicted therein, a sortation assembly 10 includes a plurality of chutes 12 which are movable along a continuous loop and along and over a plurality of sort stations 14 (FIGS. 5 and 6). The chutes are operable to deposit articles, such as mail or flats mail or the like, to appropriate bins or trays 16 positioned at the sort stations 14. The sort stations 14 are configured to support a tray 16 thereon for filling of the tray 16 by chutes 12, such as in a known manner. Each chute 12 may include an electronic tray fill level sensor 18, which is operable to detect the level of articles deposited within the tray of a sort station at which the chute is positioned. Also, each of the sort stations 14 may include an electronic tray present sensor 20, which is operable to detect the presence of a tray 16 at the respective sort station 14.

The sortation assembly 10 may include a tray handling system or tray management system (not shown), which may be operable to automatically move trays around the sort stations and to insert empty trays into or onto the sort station and to withdraw or remove full or partially filled trays from the sort station. An example of such a tray handling system is disclosed in U.S. patent application Ser. No. 09/629,009, filed Jul. 31, 2000 by Olson et al. for AUTOMATIC TRAY HANDLING SYSTEM FOR SORTER, now U.S. Pat. No. 6,561,339, which is hereby incorporated herein by reference.

The tray handling system may be operable to insert an empty tray into the sort station in response to an output of the tray present sensor 20 indicating that no tray is present at the sort station. The chutes 12 may then deposit articles or mail into trays present at the appropriate sort station, such as in a known manner. The sortation assembly or chutes may be controlled to stop depositing articles into a tray in response to an output signal from the tray fill level sensor 18 at one of the chutes indicating that the tray at which that chute is positioned has been filled to the desired or appropriate amount. After the chutes have at least partially filled the tray at a particular sort station, the sort station may discharge the full or at least partially filled tray to the tray handling system (or the handling system may extract or withdraw the full or at least partially filled tray from the sort station), such as in response to the output signal from the tray fill level sensor 18.

As can be seen in FIG. 5, electronic tray fill level sensor 18 may be positioned at chute 12 and may be directed generally downwardly toward a location at which a tray is located when the chute is positioned over a sort station supporting the tray. The electronic tray fill sensor 18 is spaced from the tray positioned at the respective sort station and is spaced from the articles deposited in the tray, such that the electronic tray fill level sensor 18 does not interfere with the depositing of articles into the tray. The tray fill level sensor 18 is operable to detect the fill level in the tray at the respective sort station and is operable to generate an output signal indicative of the fill level within the tray. A control of the sortation system may be operable at least partially in response to the tray fill level sensor 18 and may be operable to deactivate the chute or to move the chute or otherwise stop depositing articles into the tray in response to an indication or signal from the tray fill level sensor 18 indicating that the associated tray has been filled to the desired level. The chutes carrying articles destined for a tray at that particular sort station will be limited or controlled to not deposit the articles until a new tray is provided (and detected by the tray present sensor as discussed below) and the tray fill level sensor 18 indicates that the new tray is not full.

Optionally, the tray fill level sensor 18 may comprise a diffuse electronic sensor which may be operable to indicate the level of articles in the tray that is being or has been filled. The sensor may be adjusted or the control may be operable in response to different output signals, in order to facilitate adjustment of the desired fill level of the tray for different levels or percentages of tray volume, such that the sensor and sortation system may be adjusted to suit the requirements of the particular application. For example, the tray level sensor may generate an output signal to indicate that the tray is full in response to a detection of a level within the associated tray of between approximately 50% to approximately 100% of the tray capacity volume (or other levels below 50%, if desired).

Optionally, the tray fill level sensor may comprise a diffuse electronic sensor with an analog output. The output signal of such a sensor may be a voltage reading that varies as the target is moved closer to the sensor. For example, a first change in voltage may indicate to the software control system that a tray is present at the sort station at which the chute is positioned. As the mail or articles from the chutes fill the tray, the voltage output may increase until it is at a level corresponding to the predetermined or desired fill level of the tray. The control of the sortation system may then stop the chutes from depositing articles into that tray. In such an application, a control board (not shown) may be provided to convert the analog signal to two digital outputs that may operate with the control software, such as with currently used or conventional control software.

Optionally, the tray fill level sensor may comprise a single laser sensor that may be operable to generate multiple trigger point outputs. The output signals of the laser sensor may be for various predetermined heights or distances between the sensor and the articles deposited in the tray. Such an application may provide one or more partial full signals and a full signal to the control.

Optionally, the tray fill level sensor may comprise multiple sensors, such as multiple electronic diffuse sensors or the like, that may generate an output signal at different trigger points or heights or levels. The output signals of these devices may thus be for various predetermined heights or distances between the sensors and the articles deposited in the tray. Such an application may provide one or more partial full signals and a full signal to the control.

By providing one or more electronic sensors which is/are operable to provide multiple output signals associated with different levels of articles within the tray, the tray fill level sensor of the present invention may provide advance notice of when the tray will become filled to the desired level. The present invention thus facilitates a reduction of down time or out-of-service time of the sort station or stations, and thus may be particularly beneficial in automated sortation systems. The multiple outputs or trigger levels may also facilitate adjustment of the desired fill level at the control, because the control may be programmed or controlled to respond to different output signals from the tray fill level sensor or sensors.

The tray present sensor 20 may comprise a diffuse electronic sensor, or any other type of electronic sensor, such as the types of sensors discussed above with respect to the tray fill level sensor 18. The tray present sensor 20 is positioned at the sort station 14 and directed toward the area or tray support or platform of the sort station which will support a tray during filling of the tray by the chutes of the sortation assembly. The tray present sensor 20 may be generally fixedly mounted at the sortation station 14 and may be spaced from the trays which are fully positioned at the sort station. As shown in FIG. 5, the sort station 14 may include a bumper or stop member 22 for stopping further movement of the tray as it is positioned at the sort station. The stop member 22 may prevent the tray from being moved past the desired filling location and into contact with the tray present sensor 20.

Optionally, the tray present sensor 20 and/or the control may function to detect a distance between the sensor and a tray at or approaching the respective sort station. The tray present sensor 20 thus may determine the location of the approaching tray as it is moved toward and onto the sort station by the tray handling system or tray management system. The tray handling system may be operable to move the tray toward the sort station and may stop the tray in response to the signal from the tray present sensor being indicative of the appropriate or desired location or distance from the tray present sensor for filling the tray.

The tray present sensor and tray fill level sensor of the present invention thus provide for non-mechanical and non-contacting detection of a tray at the sort station and for non-mechanical and non-contacting detection of the fill level of the articles within the tray that is present at the sort station. The tray fill level sensor may allow the fill level limit of the trays to be adjusted over a wide range of volume capacity of the trays, such as between approximately 50% to approximately 100% (or other levels) of the tray volume capacity. The tray fill level sensor does not include a pivot arm or sensor arm or the like which may contact articles being deposited by the chute. The tray full level sensor of the present invention thus allows the articles or mail to drop generally freely into the tray and limits or substantially precludes the chute jam difficulties or concerns with the sensors of the sortation assemblies of the prior art. Because the tray fill level sensor and tray present sensor of the present invention are photo sensors or the like, any build-up of dust on the sensors may be quickly resolved with a simple wipe of a dust rag or the like over the optic lens of the sensors, and thus may avoid any lengthy repair or replacement of mechanical switches or the like.

Therefore, the present invention provides for a sortation assembly having electronic, non-contacting sensors for detecting the presence of a tray at a sort station and for detecting the fill level of articles within the tray. The electronic sensors may be easily cleaned and, thus, do not have to be replaced or repaired as dust may accumulate on the sensors. The electronic sensors do not include mechanical movable tray or article contacting components which pivot as the components contact either the tray or the articles being deposited into the tray. Therefore, the tray fill level sensor of the present invention does not interfere with articles being deposited from the respective chute into the trays and thus may limit or substantially avoid jamming of the articles within the chute. Also, the desired fill level of the tray can be adjusted over a wide range of tray volume capacities to adapt the system to the particular application and desired fill levels of the trays. Because the tray fill level sensor may be operable to detect different levels of articles within the trays, the tray fill level sensor of the present invention may provide advance notice or predictability of when the tray may be filled to the desired level. The tray present sensor and the tray fill level sensor of the present invention may plug into the same input/output port that conventional mechanical sensors plug into, thereby simplifying retrofitting of a known sortation assembly with the sensors of the present invention.

The present invention thus may lend itself to automation of the sortation assembly and may increase the adjustability of the trigger height of articles within the tray at which the chutes stop depositing more articles into the tray. The sensors of the present invention provide for added functionality, such as multiple trigger heights that will allow for predicting a full tray condition, which may enable a reduction of out-of-service time for the sort stations, particularly in connection with automated systems. The electronic sensors of the present invention also may eliminate the dust concerns that arise with the mechanical contacts and conventional switches which may become fouled due to poor environmental conditions of the facility. Therefore, the present invention may also reduce the maintenance, adjustability, repair and replacement of the sensors of the sortation system.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A sortation assembly for sorting articles and depositing articles into trays, said sortation assembly comprising:

a plurality of chutes movable along a continuous loop, said chutes being movable along and over a plurality of sort stations and being operable to deposit articles to trays positioned at said sort stations, said sort stations being configured to support a tray thereon for filling of the tray by said chutes; and at least one sensor positioned at each of said chutes, said at least one sensor being operable to detect a fill level in a tray at a respective one of said sort stations, said at least one sensor being spaced from the tray positioned at said respective one of said sort stations and being spaced from the articles deposited in the tray, said at least one sensor being operable to generate an output signal indicative of the fill level within the tray, said chutes being operable at least partially in response to said output signal of said sensors.

2. The sortation assembly of claim 1, wherein said at least one sensor is operable to detect a distance between said sensor and the tray or articles in the tray positioned at said respective one of said sort stations to determine a fill level within the tray, said at least one sensor being operable to generate an output signal indicative of said distance.

3. The sortation assembly of claim 1, wherein said at least one sensor comprises at least one diffuse electronic sensor.

4. The sortation assembly of claim 3, wherein said at least one diffuse electronic sensor comprises multiple diffuse electronic sensors.

5. The sortation assembly of claim 4, wherein said multiple diffuse electronic sensors are operable to generate an output at different trigger points or fill levels, said output signal of each of said multiple diffuse electronic sensors being indicative of a different fill level of the tray.

6. The sortation assembly of claim 3, wherein said output signal comprises an analog output which vanes in voltage as the fill level of the tray changes.

7. The sortation assembly of claim 1, wherein said at least one sensor comprises a laser sensor operable to generate said output signal in response to multiple distances between said sensor and articles within the tray.

8. The sortation assembly of claim 7, wherein said laser sensor is operable to generate said output signal in response to multiple trigger points.

9. The sortation assembly of claim 1 including a tray present sensor positioned at a respective one of said sort stations, said tray present sensor being operable to detect a presence of a tray at said respective sort station and being operable to generate an output signal indicative of a presence of a tray at said respective sort station, said chutes being operable at least partially in response to said output signals of said tray present sensors.

10. The sortation assembly of claim 9, wherein said tray present sensor is spaced from the tray positioned at said respective start station.

11. The sortation assembly of claim 10, wherein said tray present sensor is operable to detect a distance between said tray present sensor and a tray positioned at said respective sort station.

12. The sortation assembly of claim 11, wherein said tray present sensor comprises a diffuse electronic sensor.

13. The sortation assembly of claim 1, wherein said at least one sensor is generally fixedly mounted to said chute.

14. The sortation assembly of claim 1, wherein said at least one sensor is operable to generate said output signal in response to multiple trigger points indicative of different fill levels of the tray.

* * * * *

UNITED STATES PATENT AND TRADEMARK OFFICE

CERTIFICATE OF CORRECTION

PATENT NO. : 7,213,698 B2
APPLICATION NO. : 10/720581
DATED : May 8, 2007
INVENTOR(S) : Robert L. Stone It is certified that error appears in the above-identified patent and that said Letters Patent is hereby corrected as shown below:

Column 1:
Line 7, Insert --,-- after “application”.

Column 4:
Line 13, Insert --,-- after “application”.

Column 8:
Line 5, Claim 6, “vanes” should be --varies--.
Line 24, Claim 10, “start” should be --sort--.

Signed and Sealed this

Eleventh Day of March, 2008

JON W. DUDAS
*Director of the United States Patent and Trademark Office*